United States Patent
Wegelin et al.

(10) Patent No.: US 12,009,689 B2
(45) Date of Patent: Jun. 11, 2024

(54) DISPENSER ENERGY ON REFILL UNIT

(71) Applicant: GOJO Industries, Inc., Akron, OH (US)

(72) Inventors: Jackson William Wegelin, Stow, OH (US); Chip W. Curtis, West Dundee, IL (US)

(73) Assignee: GOJO Industries, Inc., Akron, OH (US)

( * ) Notice: Subject to any disclaimer, the term of this patent is extended or adjusted under 35 U.S.C. 154(b) by 841 days.

(21) Appl. No.: 17/033,855

(22) Filed: Sep. 27, 2020

(65) Prior Publication Data

US 2021/0099004 A1 Apr. 1, 2021

Related U.S. Application Data

(60) Provisional application No. 62/907,080, filed on Sep. 27, 2019.

(51) Int. Cl.
*H02J 7/34* (2006.01)
*H02J 7/00* (2006.01)
*H02J 7/16* (2006.01)

(52) U.S. Cl.
CPC .......... *H02J 7/345* (2013.01); *H02J 7/00038* (2020.01); *H02J 7/00714* (2020.01); *H02J 7/16* (2013.01)

(58) Field of Classification Search
CPC ....................................................... H02J 7/345
USPC ......................................................... 320/132
See application file for complete search history.

(56) References Cited

U.S. PATENT DOCUMENTS

| | | | |
|---|---|---|---|
| 2012/0013180 A1* | 1/2012 | Muto | B60L 58/21 307/9.1 |
| 2012/0187887 A1* | 7/2012 | Sone | B60L 58/20 318/504 |
| 2014/0054322 A1* | 2/2014 | McNulty | B05B 11/1087 222/190 |
| 2014/0234140 A1* | 8/2014 | Curtis | H02J 7/342 307/110 |

FOREIGN PATENT DOCUMENTS

| WO | 2014/031816 A1 | 2/2014 |
|---|---|---|
| WO | 2017/035047 A1 | 3/2017 |

OTHER PUBLICATIONS

International Search Report corresponding to International Application No. PCT/US2020/052978 dated Dec. 16, 2020, 4 pages.

* cited by examiner

*Primary Examiner* — Jerry D Robbins
(74) *Attorney, Agent, or Firm* — Cooper Legal Group, LLC

(57) ABSTRACT

A dispenser for dispensing a material includes a circuit in communication with a battery and a rechargeable energy storage device. The circuit places the battery and the rechargeable energy storage device in series during a dispense event such that an actuator that facilitates dispensing the material during the dispense event receives power from the battery and the rechargeable energy storage device during the dispense event.

24 Claims, 8 Drawing Sheets

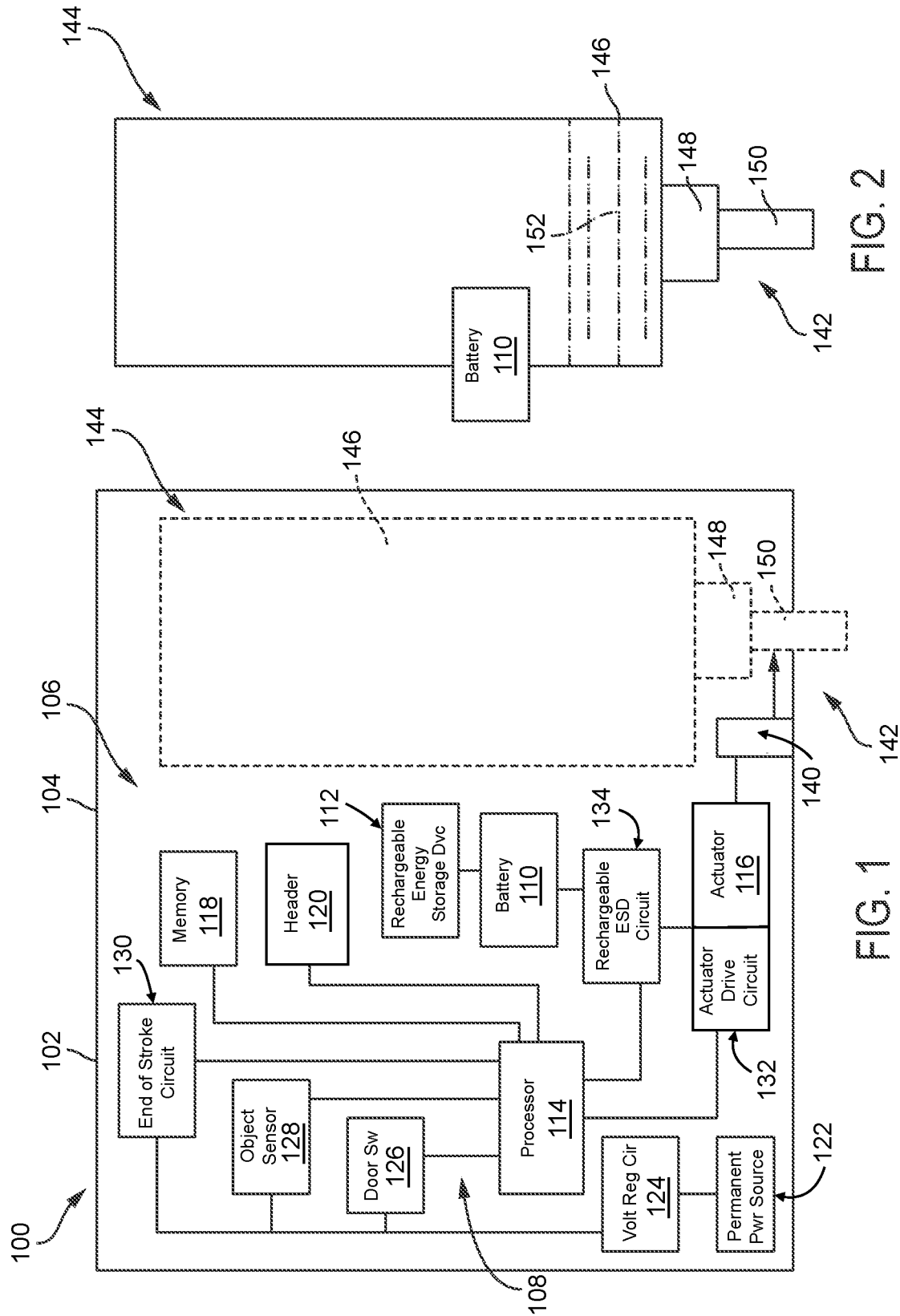

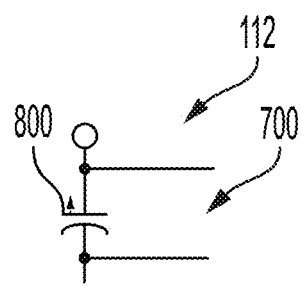
FIG. 8
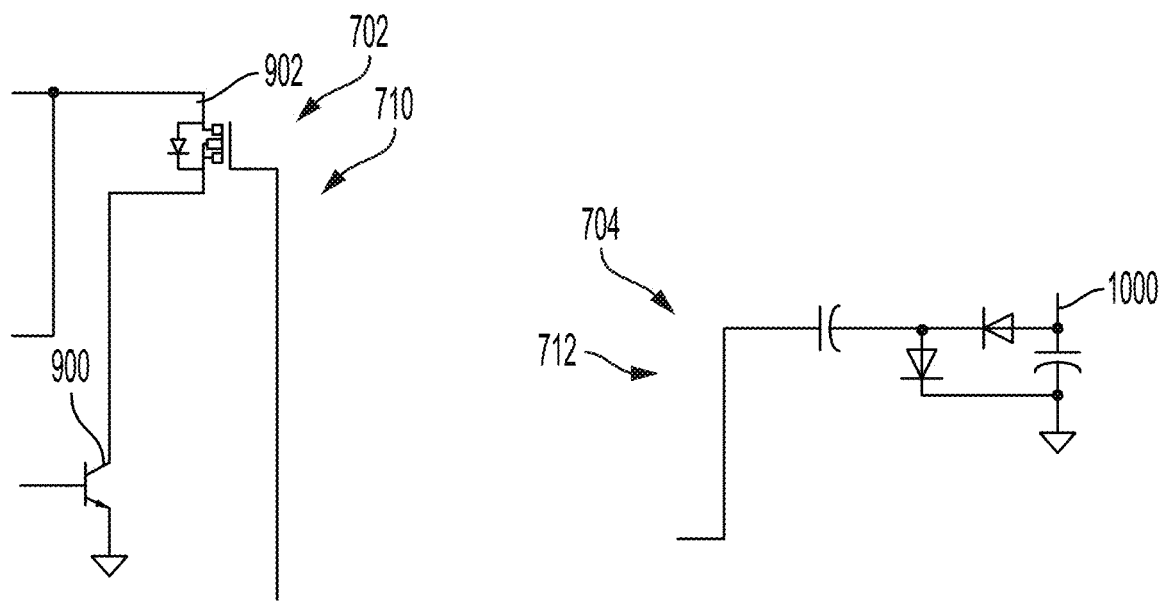
FIG. 9
FIG. 10

DISPENSER ENERGY ON REFILL UNIT

CROSS REFERENCE TO RELATED APPLICATIONS

This application claims priority to U.S. Provisional Patent Application No. 62/907,080, filed on Sep. 27, 2019, entitled "DISPENSER ENERGY ON REFILL UNIT," which is hereby incorporated by reference herein.

TECHNICAL FIELD

The instant disclosure is generally directed towards a product dispenser, or simply, a dispenser. For example, the instant disclosure is directed toward a dispenser that places a battery in series with a rechargeable energy storage device.

BACKGROUND

Dispensers can store and selectively dispense a sanitizing material (e.g., soap, hand sanitizer, cleaners, disinfectants, moisturizers etc.). As such, dispensers are commonly used in a number of different environments to improve sanitation and cleanliness, for example. Dispensers can be used, for example, in schools, hospitals, factories, restaurants, banks, grocery stores, etc., whereupon a user of the dispenser can clean his/her hands, clean an area within one of these environments, or the like.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In some examples, a dispenser for dispensing a material includes a circuit in communication with a battery and a rechargeable energy storage device. The circuit places the battery and the rechargeable energy storage device in series during a dispense event such that an actuator that facilitates dispensing the material during the dispense event receives power from the battery and the rechargeable energy storage device during the dispense event.

In some examples, a dispenser for dispensing a material includes a pump in communication with the material. The dispenser also includes an actuator in communication with the pump to actuate the pump to dispense the material during a dispense event. The dispenser further includes a circuit in communication with a battery and a rechargeable energy storage device, the circuit placing the battery and the rechargeable energy storage device in electrical communication with the actuator during the dispense event such that the actuator receives power from the battery and the rechargeable energy storage device during the dispense event.

In some examples, a method of operating a dispenser for dispensing a material includes placing a battery and a rechargeable energy storage device of the dispenser in series during a dispense event such that an actuator that facilitates dispensing the material during the dispense event receives power from the battery and the rechargeable energy storage device during the dispense event. The method also includes placing the battery and the rechargeable energy storage device in parallel in the absence of the dispense event such that the battery recharges the rechargeable energy storage device.

In some examples, a dispenser for dispensing a material includes a pump in communication with the material. The dispenser also includes an actuator in communication with the pump to actuate the pump to dispense the material during a dispense event. The dispenser further includes a battery and a rechargeable energy storage device. The battery and the rechargeable energy storage device are in series during the dispense event such that the actuator receives power from the battery and the rechargeable energy storage device during the dispense event.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DESCRIPTION OF THE DRAWINGS

FIG. 1 is a schematic illustration of a dispenser, according to some embodiments;

FIG. 2 is a schematic illustration of a refill unit, according to some embodiments;

FIG. 8 is a schematic illustration of a portion of a circuit, according to some embodiments;

FIG. 9 is a schematic illustration of a portion of a circuit, according to some embodiments;

FIG. 10 is a schematic illustration of a portion of circuit, according to some embodiments;

DETAILED DESCRIPTION

Figure 3:
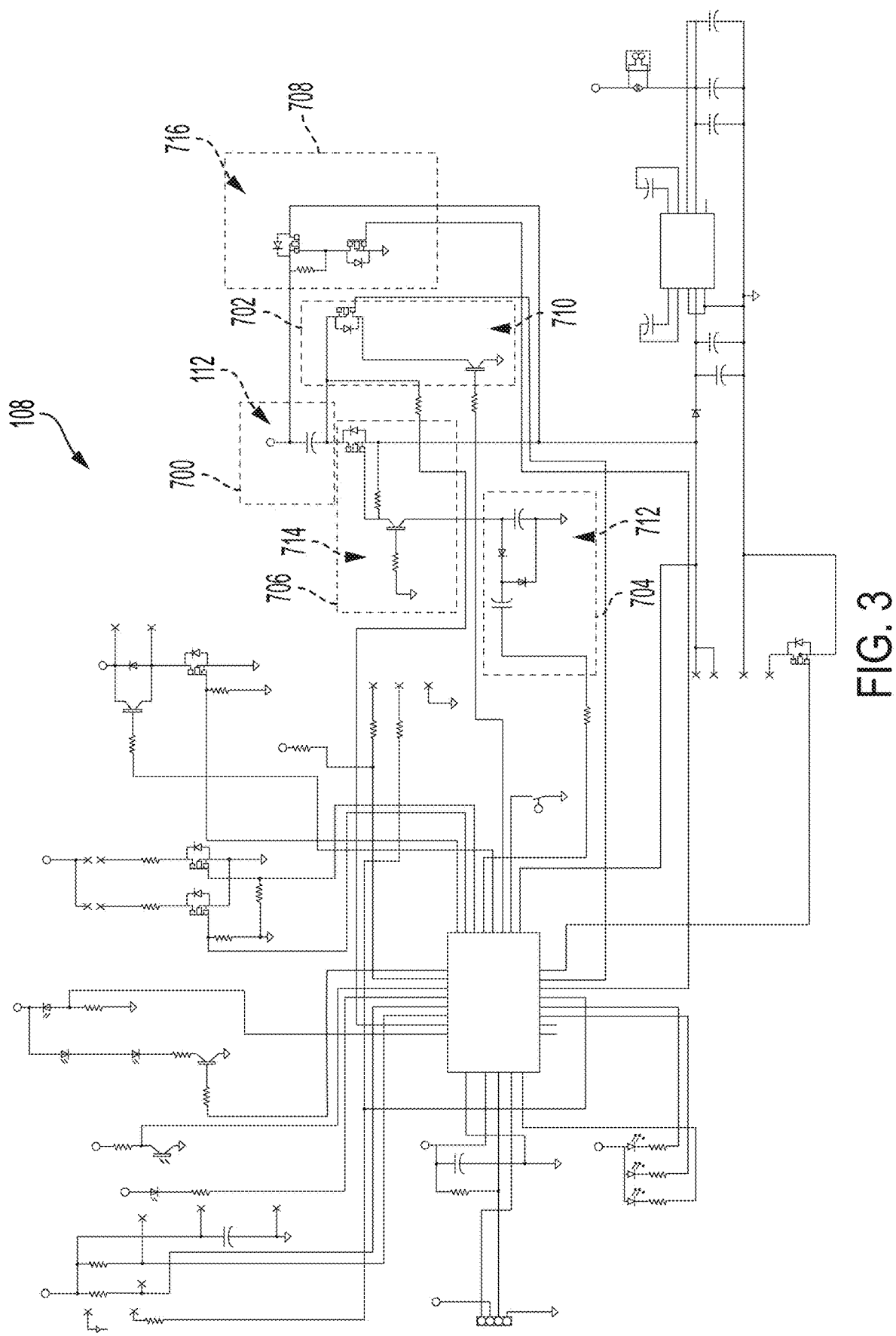
FIG. 3 is a schematic illustration of a circuit, according to some embodiments.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring to FIG. 1, a schematic representation of dispenser 100 is illustrated. In an example, the dispenser 100 can be used for storing and/or dispensing a product. The product can be a material that can comprise any type of liquid, semi-liquid, gel, powder, foam-based material, liquid that is foamed upon dispensing, etc. The material may comprise, for example, cleaning materials such as disinfectants, sanitizers, antiseptics, soaps, moisturizers, alcohol-infused liquids, or the like. In some examples, the material comprises water or other non-cleaning liquid materials. Indeed, the product is not specifically limited to these examples, and could include other types of materials.

The dispenser 100 can be attached, for example, to a surface (not shown), such as a surface of a wall, ceiling, door, object, support structure, etc. The dispenser 100 can be used in any number of environments, including, but not limited to, kitchens, bathrooms, prisons/jails, hospitals, rehabilitation facilities, nursing homes, restaurants, schools, factories, warehouses, etc.

The dispenser 100 includes a housing 102. In an example, the housing 102 comprises at least one wall 104 that can define an interior 106 of the housing 102 within which portions of the dispenser 100 can be contained. In an example, the housing 102 may be substantially hollow so as to receive one or more structures or components therein. In an example, the housing 102 comprises a rigid and/or durable structure and/or material that may be resistant to tampering and/or inadvertent access. For example, the housing 102 may comprise a metal material (e.g., steel, aluminum, titanium, etc.), though, in other examples, the housing 102 may comprise plastic materials, composite materials, etc. Indeed, the housing 102 comprises any number of materials that can limit access to the interior 106 of the housing 102.

As shown in FIG. 1, the dispenser 100 can include various components mounted within the housing 102. A circuit 108 is mounted within the housing 102. The circuit 108 may be on a single circuit board or maybe on multiple circuit boards. In addition, some components of the circuit 108 may not be located on a circuit board, but rather individually mounted and electrically connected to the other components as required. The circuit 108 is in communication (e.g., electrically connected) with a battery 110, a rechargeable energy storage device 112, a processor 114, and an actuator 116. It is to be understood that any number of other components can be included with the circuit 108. Some examples of the circuit 108 can include memory 118, a header 120, a permanent power source 122, a voltage regulator circuit 124, a door switch circuit 126, an object sensor 128, an end-of-stroke circuit 130, an actuator drive circuit 132, a rechargeable energy storage device circuit 134, and a power source interface receptacle 136. Of course, other electronic components can be included with the circuit 108 as needed. In FIG. 1, the lines connecting the above listed electronic components can include any suitable type of electrical connection to place the electrical components in electrical communication with one another.

The processor 114 may be any type of processor, such as, for example, a microprocessor or microcontroller, discrete logic, such as an application-specific integrated circuit (ASIC), other programmed logic device, or the like. If the circuit 108 includes a header 120, the processor 114 is in electrical communication with the header 120. In some examples, the header 120 can be located in a circuit connection port so that a user can connect to the circuit 108 to program the circuit 108, run diagnostics on the circuit 108, and retrieve information from the circuit 108.

If the circuit 108 includes the memory 118, the processor 114 is in electrical communication with the memory 118. The memory 118 can be any type of memory, such as, for example, Random Access Memory (RAM); Read Only Memory (ROM); programmable read-only memory (PROM), electrically programmable read-only memory (EPROM), electrically erasable programmable read-only memory (EEPROM), magnetic disk or tape, optically readable mediums including CD-ROM and DVD-ROM, or the like, or combinations of different types of memory. In some examples, the memory 118 is separate from the processor 114, and in some examples, the memory 118 resides on or within processor 114.

As previously noted, some examples of the circuit 108 can include a permanent power source 122. In some examples, the permanent power source 122 is mounted on the housing 102 and can include, for example, one or more batteries. The permanent power source 122 can be designed so that the permanent power source 122 does not need to be replaced for the life of the dispenser 100. The permanent power source 122 can be in electrical communication with the voltage regulator circuit 124. In some examples, the voltage regulator circuit 124 provides regulated power to the processor 114, the object sensor 128, the end-of-stroke circuit 130, and a door switch circuit 138. The permanent power source 122 may be used to provide electrical power to other circuits or circuitry that requires a relatively low amount of power that is not anticipated to drain the permanent power source 122 prematurely.

The processor 114 is in electrical communication with the door switch circuit 138 so that processor 114 can determine when the dispenser 100 door (not shown) is closed. In some embodiments, the processor 114 will not allow the dispenser 100 to dispense a dose of material from the dispenser 100 if the door is open. The door switch circuit 138 may be any suitable type of circuit including, but not limited to, a mechanical switch, a magnetic switch, a proximity switch or the like. The processor 114 is also in electrical communication with an object sensor 128 for detecting whether an object is present in the dispense area. The object sensor 128 may be any type of passive or active object sensor including, but not limited to, an infrared sensor and detector, a proximity sensor, an imaging sensor, a thermal sensor or the like.

The processor 114 is in electrical communication with the actuator 116. The actuator 116 is in communication with a pump 142 to actuate the pump 142 to dispense the material during a dispense event. The actuator 116 causes a motor (not shown) and an associated gearing 140 to operate a pump 142 (e.g., a foam pump) located on a refill unit 144. In addition, the end-of-stroke circuit 130 is in electrical communication with the processor 114 and provides the processor 114 with information relating to the end-of-stroke for the foam pump 142 so that the processor 114 can determine when to stop the motor and associated gearing 140. The end-of-stroke circuit 130 may include, for example, an encoder, a physical switch, a magnetic switch, software algorithm, or the like. Of course, in some examples, the material is not a liquid that is foamed upon dispensing, and in those examples the foam pump 142 is not required.

A refill unit 144 is shown in dashed lines inserted in the dispenser 100 in FIG. 1 and is also illustrated in solid lines in FIG. 2. This illustrates that refill unit 144 is inserted into the dispenser 100 and removed from the dispenser 100 as a unit. The refill unit 144 includes a container 146, the pump 142 (e.g., a foam pump) that includes an air compressor 148 and an outlet 150. The refill unit 144 also contains a material 152 which can include any of the previously mentioned types of material for dispensing by the dispenser 100. In some examples, refill unit 144 is for use in a liquid dispenser rather than a foam dispenser, and the refill unit 144 is filled with liquid that is not foamed. Accordingly, the air compressor 148 is not required. As shown in FIG. 2, some examples of the refill unit 144 can include the battery 110.

Furthermore, in some examples, any number of components of the dispenser 100 can be included solely on the refill unit 144. For example, the battery 110 can be located solely on the refill unit 144 rather than located on the housing 102. In other examples, a portion of the battery 110 can be located on the refill unit 144 and cooperate with another portion of the battery 110 located on the housing 102. Similarly, in some other examples, the rechargeable energy storage device 112 can be located solely on the refill unit 144 or a portion of the rechargeable energy storage device 112 can be located on the refill unit 144 and work in cooperation with another portion of the rechargeable energy storage device 112 located on the housing 102. It is contemplated that other electronic components noted above can be arranged in a similar fashion.

In some examples, at least one of the pump 142, the actuator 116, the circuit 108, or the rechargeable energy storage device 112 is on (e.g., attached to) the housing 102 and the refill unit 144 is selectively attachable to the housing 102.

Referring to FIG. 3, a circuit diagram of the circuit 108 is shown. The circuit 108 is configured to place the battery 110 (shown in FIG. 1) and the rechargeable energy storage device 112 in series during a dispense event. In this way, the actuator 116 that facilitates dispensing the material during a dispense event receives power from the battery 110 and the rechargeable energy storage device 112 during a dispense event. The circuit 108 is also configured to place the battery 110 and the rechargeable energy storage device 112 in parallel during the absence of a dispense event such that the battery 110 recharges the rechargeable energy storage device 112 while in parallel with the battery 110. The circuit 108 is shown in FIG. 3 without dashed lines highlighting particular parts of the circuit 108 for clarity.

In some examples, the battery 110 can be a single AA battery. However, any suitable battery can be used for the purposes of this disclosure provided the battery 110 provides the characteristics required to operate the dispenser as described. In some examples, the battery 110 is engineered or chosen from a standard battery type such that its anticipated service life is equal to or approximates the anticipated service life of the refill unit 144. In other words, the battery 110 is designed or selected in order to have power until the refill unit 144 is emptied of product. As such, the battery 110 will either eliminate or significantly reduce the required frequency of replacing the battery 110. Instead, as the refill unit 144 is replaced, a new battery mounted to the replacement refill unit will effectively replace the depleted battery 110 as the depleted battery 110 is removed with the older refill unit 144.

In some examples, the rechargeable energy storage device 112 includes a capacitor. In some examples, the rechargeable energy storage device 112 includes a plurality of capacitors, and the number of capacitors and their electrical properties can be engineered or selected to comport with the voltage of the motor (not shown) and the battery 110. In some examples, the rechargeable energy storage device 112 includes a supercapacitor. For the purposes of this disclosure a supercapacitor is a high-capacity capacitor with a capacitance value that is relatively high compared to other capacitors, but with lower voltage limits. Supercapacitors can often store 10 to 100 times more energy per unit volume or mass than electrolytic capacitors, can accept and deliver charge much faster than batteries, and can tolerate many more charge and discharge cycles than rechargeable batteries. In some examples, the supercapacitor has a capacitance of 0.1 Farad (F) or greater. In some examples, the supercapacitor has a capacitance of 1 to 10 F. In some examples, the supercapacitor can include electrostatic double layer capacitance. In some examples, the rechargeable energy storage device 112 can be a rechargeable battery.

Figure 4:
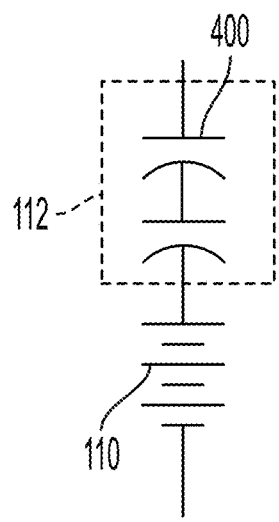
FIG. 4 is a schematic illustration of a portion of a circuit, according to some embodiments.

Referring to FIG. 4, a circuit schematic is illustrated to show the basic concept of the battery 110 placed in series with the rechargeable energy storage device 112 during a dispense event. In the shown example, the rechargeable energy storage device 112 includes a first capacitor 400 and a second capacitor 402. As discussed previously, the rechargeable energy storage device 112 can include other components, and the shown example is one of many potential configurations of the rechargeable energy storage device 112.

Figure 5:
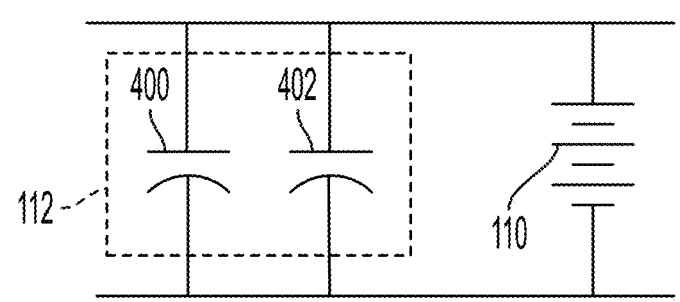
FIG. 5 is a schematic illustration of a portion of a circuit, according to some embodiments.

Referring to FIG. 5, a circuit schematic is illustrated to show the basic concept of the battery 110 placed in parallel with the rechargeable energy storage device 112 in the absence of a discharge event. As with FIG. 4, the rechargeable energy storage device 112 includes the first capacitor 400 and the second capacitor 402. As discussed previously, the rechargeable energy storage device 112 can include other components, and the shown example is one of many configurations of the rechargeable energy storage device 112.

Figure 6:
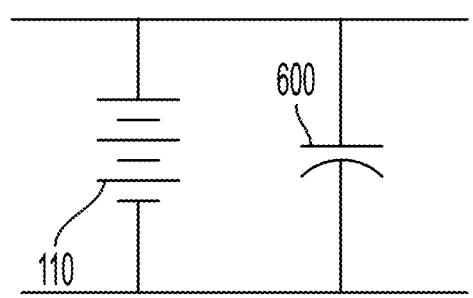
FIG. 6 is a schematic illustration of a portion of a circuit, according to some embodiments.

Referring to FIG. 6, a circuit schematic is illustrated. In some examples, the circuit 108 can include a capacitor 600 permanently placed in parallel with the battery 110. The capacitor 600 is separate and distinct from the rechargeable energy storage device 112, and the capacitor 600 can be located either on the housing 102 or on the refill unit 144. The capacitor 600 placed in parallel with the battery 110 can increase resistance as the battery 110 discharges during a dispense event. It is contemplated that the parallel relationship between the capacitor 600 and the battery 110 can be a portion of the circuit 108 whether the battery 110 is in parallel with the rechargeable energy storage device 112 in the absence of a dispense event or the battery 110 is in series with the rechargeable energy storage device 112 during a discharge event.

Figure 7:
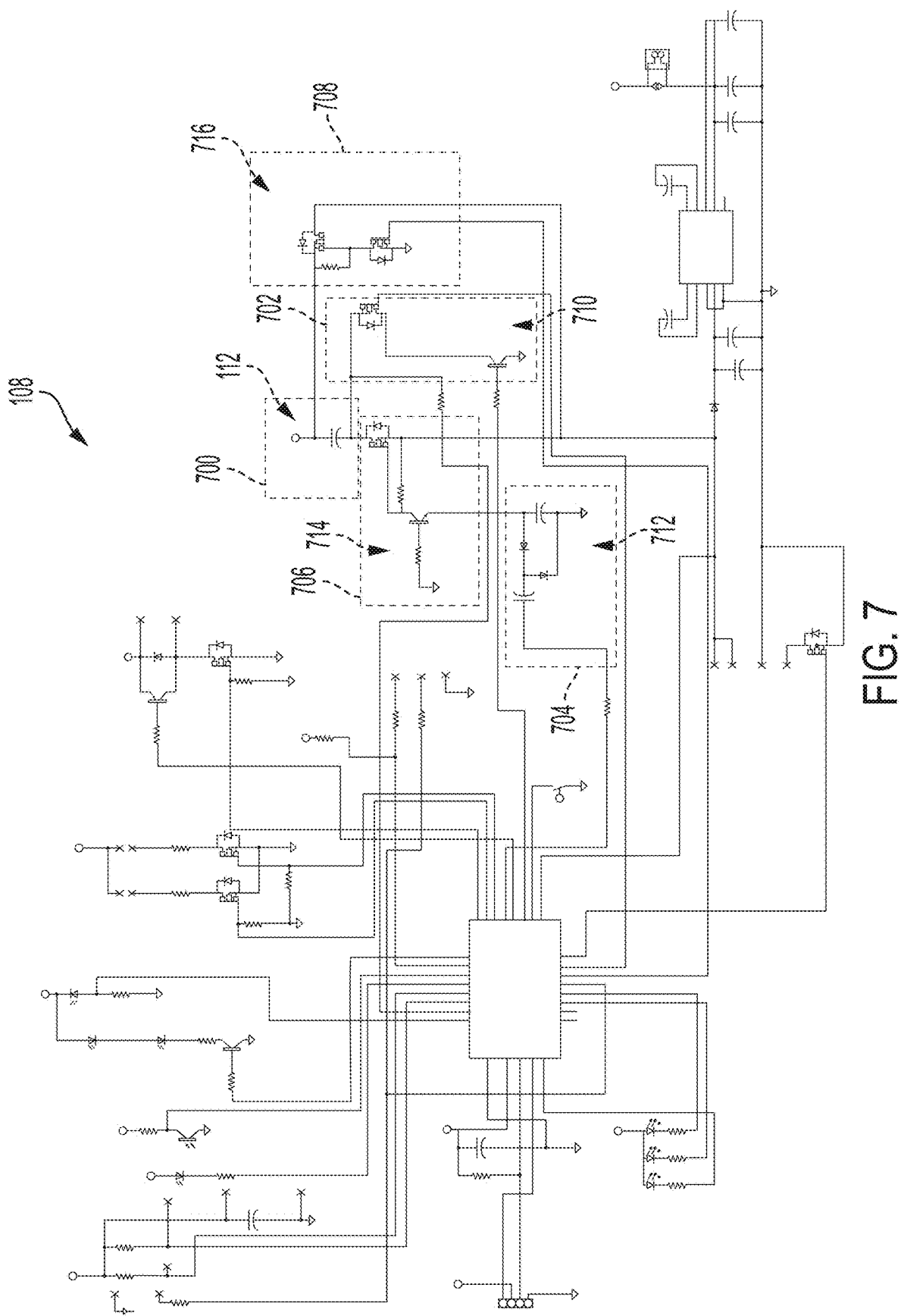
FIG. 7 is a schematic illustration of a circuit, according to some embodiments.

Referring to FIG. 7, the circuit 108 of FIG. 3 is shown with several circuit portions outlined in dashed lines for discussion purposes. The circuit 108 includes the rechargeable energy storage device 112 shown at portion 700. A current source portion 710 is shown at section 702, and a charge pump 712 is shown at portion 704. The circuit 108 further includes a series switch 714 shown at portion 706 and a parallel switch 716 shown at portion 708.

Referring to FIG. 8, the rechargeable energy storage device 112 of portion 700 of the circuit 108 is shown in detail. As previously discussed, the rechargeable energy storage device 112 can include one or more capacitors, one or more supercapacitors, one or more rechargeable batteries, or any other suitable rechargeable device. In the shown example of FIG. 8, the rechargeable energy storage device 112 includes one supercapacitor 800.

Referring to FIG. 9, section 702 of the circuit 108 is shown in detail. This section 702 highlights the current source 710 of the circuit 108. The current source 710 can include transistor 900 and transistor 902. In some examples, the current source 710 can supply a constant current to the circuit 108 regardless of the voltage developed across its terminals.

Referring to FIG. 10, portion 704 of the circuit 108 is shown in detail. Portion 704 shows the charge pump 712. In some examples, the charge pump 712 provides a voltage that crosses a threshold voltage at connection point 1000.

Figure 11:
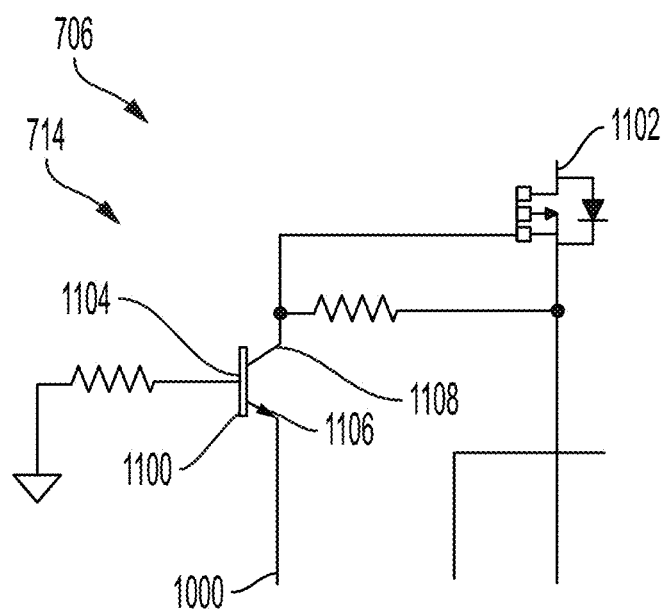
FIG. 11 is a schematic illustration of a portion of a circuit, according to some embodiments.

Referring to FIG. 11, portion 706 of the circuit 108 representing the series switch 714 is shown in detail. The voltage provided by the charge pump 712 enters the series switch 714 at connection point 1000. The series switch 714 can include a first transistor 1100 and a second transistor 1102. In some examples, the first transistor 1100 can be an N-MOSFET (NPN) or a P-MOSFET (PNP) transistor, and the voltage provided by the charge pump 712 can change the state of the first transistor 1100. In the case of the first transistor 1100 being an NPN transistor, the voltage applied at a base terminal 1104 of the first transistor 1100 determines whether a switching operation is performed. When a sufficient voltage (e.g., voltage >0.7V) is applied between the base terminal 1104 and an emitter terminal 1106, a voltage from a collector terminal 1108 to the emitter terminal 1106 is approximately equal to zero. Therefore, the first transistor 1100 acts as a short circuit.

Similarly, when no voltage or zero voltage is applied at the base terminal 1104, the first transistor 1100 operates in a cut-off region and acts as an open circuit. In this type of switching connection, a load is connected to the switching output with a reference point. Thus, when the first transistor 1100 is switched ON, current will flow from a source to a ground through the load. In this example, the threshold voltage can be 0.7 V. Other example threshold voltages are contemplated based upon the specifications of each of the electronic components, and the threshold voltages can be crossed as the voltage signal supplied by the charge pump 712 or other components varies between differing magnitudes.

Remaining with FIG. 11, the first transistor 1100 can be a PNP transistor as shown. In these examples, the PNP transistor works similarly to the NPN for a switching operation, however, the current flows from the base terminal 1104. This type of switching can be used for negative ground configurations. For the PNP transistor, the base terminal 1104 is negatively biased with respect to the emitter terminal 1106. In this switching, base current flows when the base voltage is more negative. Simply a low voltage or a "more negative" voltage makes the first transistor 1100 conduct current or operate as a short circuit, otherwise the first transistor 1100 will conduct little to no current or operate as an open circuit or be in a high impedance state. In some examples, the low voltage requirement is 0.7 volts, as noted above, and the application of a negative voltage rather than simply a 0.7 bias voltage, the transistor can switch relatively fast. As such, if the charge pump 712 provides a negative voltage to the first transistor 1100, the first transistor 1100 can be switched faster, thereby causing the battery 110 to be placed into series with the rechargeable energy storage device 112 relatively quickly. This quick switching of the first transistor 1100 can reduce and/or eliminate undesired discharge of the capacitors through the circuit 108. In some examples, the threshold voltage can be 0 V, and the charge pump 712 is configured to communicate a negative voltage signal during each dispense event. The negative voltage signal is provided to the series switch 714 through the connection shown at 1000 which is in electrical communication with the charge pump 712 and the series switch 714. This negative voltage will help change the state of the first transistor 1100 more quickly than if pulled to ground. This change of state of the first transistor 1100 places the battery 110 in series with the rechargeable energy storage device 112 for a dispense event.

Therefore, as the charge pump 712 provides a voltage at connection point 1000 that crosses the threshold voltage (e.g., changes from a positive voltage to a negative voltage), the first transistor 1100 will change its state.

As a brief summary, the previously described negative voltage signal is received at connection point 1000 from the charge pump 712 and is communicated to the first transistor 1100. This negative voltage signal causes the first transistor 1100 to switch to an on position with a significantly lower resistance. This series switch 714 places the battery 110 in series with the rechargeable energy storage device 112.

Figure 12:
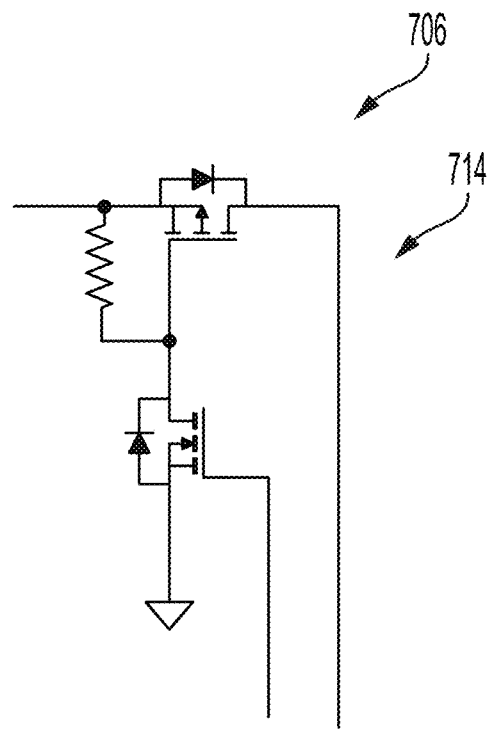
FIG. 12 is a schematic illustration of a portion of a circuit, according to some embodiments.

Referring to FIG. 12, portion 708 of the circuit 108 representing the parallel switch 716 is shown in detail. The parallel switch 716 enables the circuit 108 to place the battery 110 and the rechargeable energy storage device 112 in parallel in the absence of a dispense event. As such, when the circuit 108 does not detect a dispense event, the battery 110 and the rechargeable energy storage device 112 will be in electrical communication in parallel.

Returning to FIG. 1, in some examples, a dispense event can be triggered when the object sensor 128 detects an object present in the dispense area. The processor 114 is in electrical communication with the object sensor 128 as previously discussed and the processor 114 receives an electrical signal from the object sensor 128 indicating the presence of an object in the dispense area. At that time, in no particular order, 1) the processor 114 can direct the charge pump 712 to activate the first transistor 1100 to place the battery 110 in series with the rechargeable energy storage device 112 and 2) the processor 114 delivers an electrical signal to the actuator 116 that causes the motor (not shown) and an associated gearing 140 to dispense product from the container 146 (e.g., operate the pump 142). A dispense event may be initiated in any number of ways for dispensing the product from the container 146 to a user. In some examples, the dispenser 100 includes one or more object sensors 128 that are in communication with the pump 142. The object sensors 128 can detect the presence of a user's hand positioned beneath the outlet 150 and in turn send a signal to the processor 114. The processor 114 can generate an output that is connected to the pump 142 and/or the power source 342. This output can trigger a dispense event, whereupon the pump 142 can dispense the material 152 from the container 146. At times, the object sensors 128 can operate in a standby mode to reduce power consumption. This architecture is capable of a dispense every few seconds, without backup batteries, e.g., a broken beam object sensor 128 can operate on ultra-low standby power.

In some examples, a dispense event can be triggered by operation of the actuator 116. In yet further examples, a dispense event can be deemed to begin at a time when the processor 114 receives a signal that the rechargeable energy storage device 112 has received a pre-determined adequate charge (e.g., 75% of rated capacity). Regardless of the timing of a dispense event, or when a dispense event is triggered, the circuit 108 is configured to place the battery 110 in series with the rechargeable energy storage device 112 during dispense events, (e.g., when the actuator 116 causes the motor (not shown) to dispense product from the container 146). After completion of a dispense event, the circuit 108 places the battery 110 in parallel with the rechargeable energy storage device 112 so that the battery 110 charges the rechargeable energy storage device 112.

For the purposes of this disclosure, detection of a dispense event can occur in any suitable manner. In some examples, a dispense event is signaled by detection of an object within a dispense zone through object sensor 128 (shown in FIG.

1). In some examples the object sensor 128 is chosen because of its relatively low power consumption. However, other structures or methods for detecting a dispense event can be used. After a dispense event, the parallel switch 716 as shown in FIG. 12 will place the battery 110 and the rechargeable energy storage device 112 in parallel.

Returning to FIG. 1, during a dispense event, when the battery 110 and the rechargeable energy storage device 112 are in series, the actuator 116 receives an electrical signal comprising the added voltages of each of the capacitors of the rechargeable energy storage device 112 and the battery 110 in order to operate the actuator 116. The actuator 116 is in communication with the pump 142 (e.g., a foam pump) such that operation of the actuator 116 urges operation of the pump 142. The pump is in communication with the material 152 within the container 146 and dispenses material 152 from the container 146 of the refill unit 144. In some examples, the pump 142 is in communication with the refill unit 144.

It is to be appreciated that additional schemes and structures for initiating a dispense event may be incorporated into the dispenser 100. That is, the dispenser 100 is not limited to including the object sensors 128 for detecting the presence of the user's hand Rather, in some examples, the dispenser 100 may be operated by other means.

The described series arrangement of the battery 110 and the rechargeable energy storage device 112 during a dispense event enables a voltage rating of the actuator to be greater than a voltage of the battery. Here, the term "voltage rating" is used to indicate the rated voltage of the actuator 116. As an example, the actuator may be rated to properly operate at 6 V. Because the battery 110 and the rechargeable energy storage device 112 are configured in series during a dispense event, the battery 110 can produce a signal of 3 volts and the rechargeable energy storage device 112 can include two capacitors producing 1.5 volts each. The sum of the voltage ratings for the battery 110 and the rechargeable energy storage device 112 is thus 6 volts, and properly operates the actuator 116 to dispense material 152. Of course, many combinations of voltage ratings for the actuator 116, the battery 110, and the rechargeable energy storage device 112 are contemplated for use with the apparatus and methods of this disclosure. In some examples, the battery 110 has a voltage of less than about 3 volts. As is expected, the participation of the battery 110 in the dispense event to supply voltage to the actuator 116 can add a third more power than in some previous dispensers that do not include the battery 110 in the dispense event. In other terms, the circuit 108 places the battery 110 and the rechargeable energy storage device 112 in series during a dispense event such that the actuator 116 that facilitates dispensing the material 152 during a dispense event receives power from the battery 110 and the rechargeable energy storage device 112 during a dispense event.

As can be appreciated, some example dispensers 100 may be located in environments that may require relatively frequent dispense events and relatively rapid dispense events. As such, the dispenser 100 is, at times, expected to be able to relatively quickly recharge the rechargeable energy storage device 112 in preparation for the next dispense event. In some examples, the rechargeable energy storage device 112 can deliver an electrical signal to the actuator 116 that causes the motor (not shown) and an associated gearing 140 to dispense product from the container 146 (e.g., operate the pump 142). The presently described structure enables the dispenser 100 to deliver product reliably despite potential frequent and rapid initiation of dispense events.

In some examples, the rechargeable energy storage device 112 can be a capacitor or supercapacitor as has been described. The described circuit 108 and structures enable removal of a capacitor or supercapacitor and effectively replace the capacitor or supercapacitor with a battery at the dispense event to power the actuator 116. This replacement can significantly reduce the time required to recharge the rechargeable energy storage device 112 because there is one less capacitor or supercapacitor to charge in preparation for the dispense event. For example, if a dispenser included three capacitors previously, the presently disclosed circuit enables two capacitors and one battery to operate the actuator 116 rather than three capacitors operating the actuator 116 with the battery remaining idle at the dispense event. For example, if the actuator 116 requires one joule to operate efficiently, the battery of some previous examples would charge the three capacitors to about 0.33 joules each. However, with the presently disclosed arrangement, the battery can charge two capacitors to about 0.33 joules each while the remaining 0.33 joules necessary to operate the actuator 116 can come directly from the battery. A 33% reduction in charging time can thus be realized. In some examples, the addition of the battery and removal of a capacitor or supercapacitor from the discharge operation can increase the internal resistance in the battery.

In some examples, the described architecture is capable of a dispense event every few seconds as noted previously, without backup batteries and a 0.75 second reduction in charging time can be realized. A broken beam sensor 128 provides ultra-low standby power. In some examples, the supercapacitors can have about a 2.5 to about 3 volt maximum operating voltage, and the supercapacitors are not charged past the voltage of the alkaline cell (e.g., 1.5 volts), thus self-discharge of the supercapacitors is greatly reduced.

As has been discussed, the circuit 108 places the battery 110 and the rechargeable energy storage device 112 in parallel in the absence of a dispense event. This arrangement enables the battery 110 to recharge the rechargeable energy storage device 112. In some examples, when a refill unit 144 is inserted into dispenser 100, the battery 110 begins to recharge the rechargeable energy storage device 112. In some examples, the rechargeable energy storage device 112 is rated at voltages greater than the voltage required to power the motor and associated gearing 450 to dispense a dose of material 152 (e.g., foam). The oversized capacity of the rechargeable energy storage device 112 can be charged to a voltage that is less than the fully rated capacity of the rechargeable energy storage device 112. Because the rechargeable energy storage device 112 is charged to less than full voltage capacity, there is less discharge of the rechargeable energy storage device 112 when the rechargeable energy storage device 112 is idle for a period of time. In some examples, the rechargeable energy storage device 112 is charged to less than about 50% of its rated capacity. In other examples, the rechargeable energy storage device 112 is charged to less than about 75% of its rated capacity. In still other examples, the rechargeable energy storage device 112 is charged to less than about 90% of its rated capacity.

In some examples, the refill unit 144 can include an identification circuitry, such as, for example, an RFID chip (not shown). The RFID chip may contain an authentication code. When the refill unit 144 is inserted into the dispenser 100, the dispenser 100 uses identification circuitry (not shown), such as, for example, an RFID reader to read the authentication code. If the code matches a pre-stored code, the dispenser 100 operates as described above. If, however, the code does not match, or no code is identified, the dispenser 100 can take another course of action, such as, for example, not operating, prematurely draining the battery 110 in the refill unit 144 leaving the refill unit 144 at least partially full of product, or causing the actuator to dispense the contents of the refill unit 144 even though no object is detected by object sensor 128.

Figure 13:
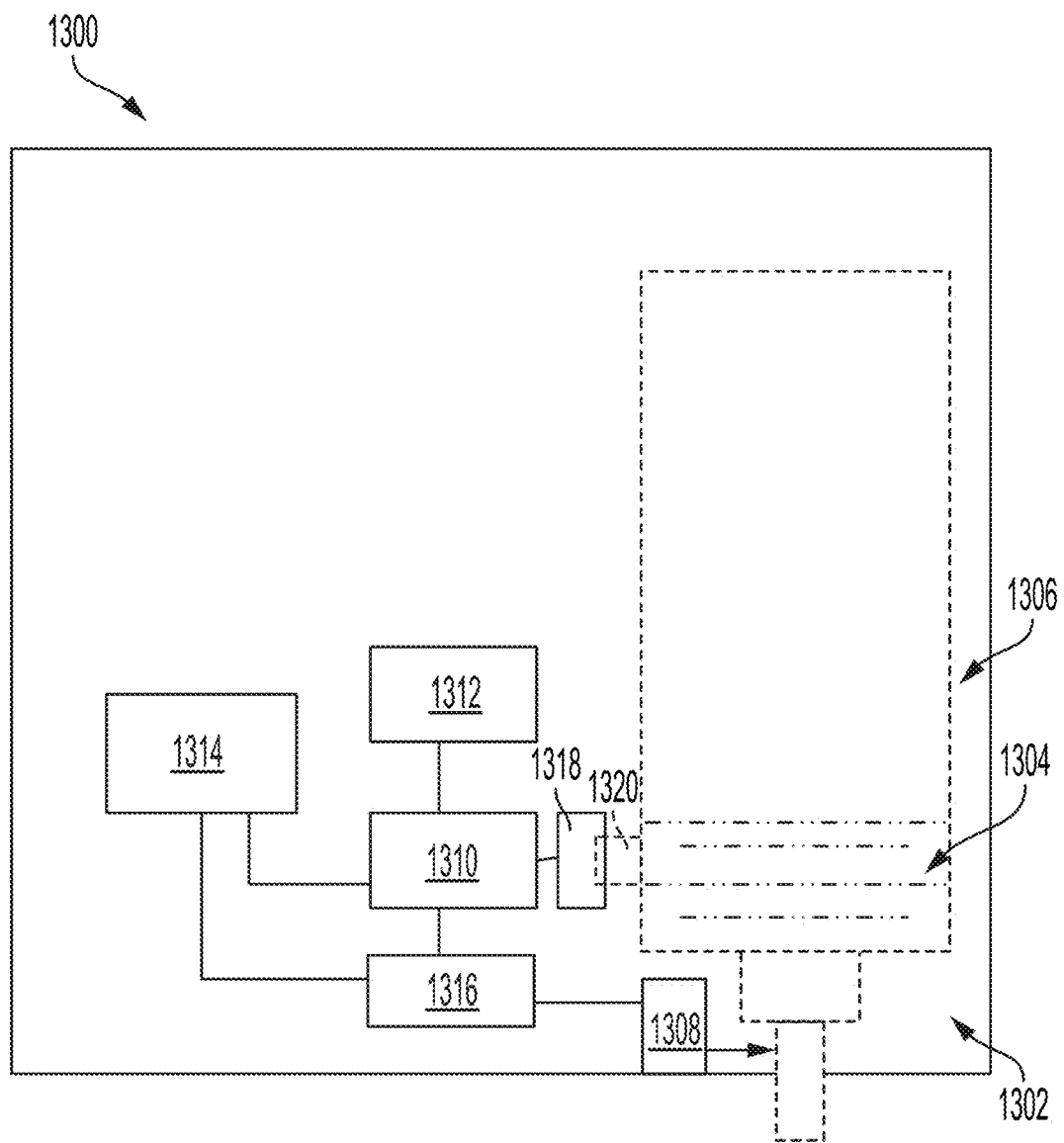
FIG. 13 is a schematic illustration of a dispenser, according to some embodiments.

Referring to FIG. 13, a schematic representation of a dispenser 1300 is shown. In some examples, the dispenser 1300 includes a pump 1302 (e.g., a foam pump) in communication with the material 1304 that is located within a refill unit 1306. An actuator 1308 is in communication with the pump 1302 to actuate the pump 1302 to dispense the material 1304 during a dispense event. The dispenser 1300 also includes a battery 1310 and a rechargeable energy storage device 1312. The battery 1310 and the rechargeable energy storage device 1312 are placed in series with each other during the dispense event such that the actuator 1308 receives power from the battery 1310 and the rechargeable energy storage device 1312 during the dispense event.

The dispenser 1300 can also include a processor 1314 and an actuator drive circuit 1316. A power source interface receptacle 1318 can be provided on the housing 102 in order to cooperate with a portion 1320 of the refill unit 1306. In some examples, the portion 1320 can be an electrical connector, a portion of the battery 110, etc. The power source interface receptacle 1318 and the portion 1320 can provide electrical communication between the refill unit 1306 and the circuit 108.

Figure 14:
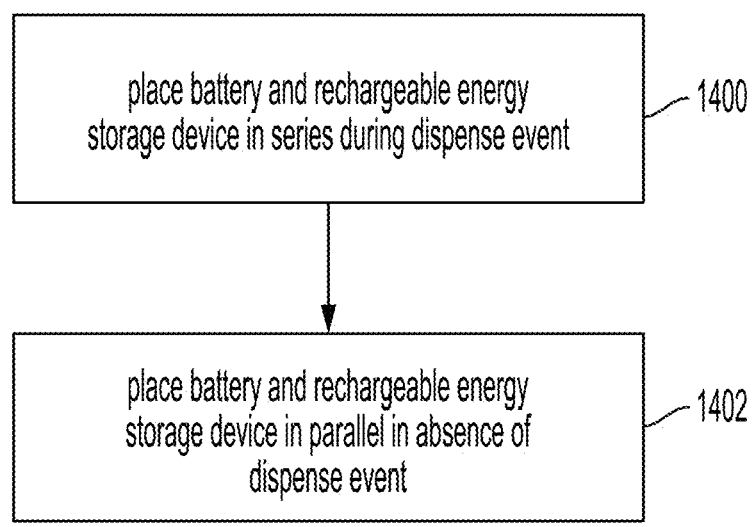
FIG. 14 is a flow chart of a method of operating a dispenser, according to some embodiments.

Referring to FIG. 14, a method of operating some examples of the dispenser is illustrated in a top-down flow chart. The method includes placing the battery and the rechargeable energy storage device of the dispenser in series during a dispense event 1400. With this series arrangement, the actuator that facilitates dispensing the material during the dispense event receives power from the battery and the rechargeable energy storage device during the dispense event.

The method also includes placing the battery and the rechargeable energy storage device in parallel in the absence of a dispense event 1402 such that the battery recharges the rechargeable energy storage device.

A number of benefits can be realized using the apparatus and methods described in the present disclosure. In some examples, the apparatus and methods can eliminate or reduce the need for persons to replace batteries in the field. For example, because the battery can be mounted to the refill unit and is designed to retain power for the expected duration of the material or product within the refill unit, no additional time, manpower, etc. needs to be expended to check the battery life or replace the battery on the refill unit. Rather, as the spent refill unit is removed, and the replacement refill unit is put in place, the fresh battery on the replacement refill unit will take the place of the battery on the spent refill unit. In some examples, the refill unit can be fully depleted by a battery located on the refill unit.

Additionally, because of the relatively low power usage of the described dispenser, the dispenser can retain necessary electrical power required for operation in environments requiring either high usage of material or in environments requiring low usage of material. In some examples, the dispenser can operate on standby power (including self-discharge of batteries and capacitors) and maintain a low power consumption level to maintain power (e.g., electrical energy) in the battery to survive a two-year depletion rate of material from the refill unit. In some examples, these benefits can be achieved without the use of backup batteries; therefore eliminating the cost of those batteries. The described circuit components can provide a virtually ideal energy (e.g., power source) on the refill unit.

Other benefits of the described apparatus and methods can include a dispenser that is capable of relatively quick replenishment of power to the rechargeable energy storage device during the entire life cycle of the battery. The dispenser can also exhibit a relatively low rate of power self-discharge from the rechargeable energy storage device because the rechargeable energy storage device is not charged to a greater voltage than the battery. This charge difference improves the efficiency of the dispenser while lowering power requirements.

Furthermore, the described apparatus can require less energy storage within the rechargeable energy storage device (e.g., the rechargeable energy storage device includes supercapacitors). Also, the described apparatus and methods can lower the cost of the dispenser while being suitable for nearly all dispenser markets. Still further, the described dispenser can save space for storage and replacement dispensers by providing a dispenser that is suitable for so many markets. Lastly, the described dispenser can be constructed relatively inexpensively compared to other dispensers.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component generally correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A dispenser for dispensing a material, comprising:
a circuit in communication with a battery and a rechargeable energy storage device, the circuit placing the battery and the rechargeable energy storage device in series during a dispense event such that an actuator that facilitates dispensing the material during the dispense event receives power from the battery and the rechargeable energy storage device during the dispense event,
wherein the circuit places the battery and the rechargeable energy storage device in parallel in the absence of the dispense event such that the battery recharges the rechargeable energy storage device.

2. The dispenser of claim 1, wherein the battery recharges the rechargeable energy storage device to less than about 75% of a rated capacity of the rechargeable energy storage device.

3. The dispenser of claim 1, wherein the battery recharges the rechargeable energy storage device to less than about 50% of a rated capacity of the rechargeable energy storage device.

4. The dispenser of claim 1, comprising:
a pump in communication with the material, wherein the actuator is in communication with the pump to actuate the pump to dispense the material during the dispense event.

5. The dispenser of claim 1, wherein the rechargeable energy storage device comprises a capacitor.

6. The dispenser of claim 1, wherein the rechargeable energy storage device comprises a rechargeable battery.

7. The dispenser of claim 1, wherein the rechargeable energy storage device comprises a plurality of capacitors.

8. The dispenser of claim 7, wherein during the dispense event, the rechargeable energy storage device provides a voltage to the actuator that is equal to the added voltages of each of the plurality of capacitors and the battery.

9. The dispenser of claim 1, wherein a voltage rating of the actuator is greater than a voltage of the battery.

10. The dispenser of claim 1, wherein the circuit comprises a transistor and a charge pump configured to provide a voltage to the transistor to change a state of the transistor, thereby causing the battery to be placed in series with the rechargeable energy storage device.

11. A dispenser for dispensing a material, comprising:
a pump in communication with the material;
an actuator in communication with the pump to actuate the pump to dispense the material during a dispense event; and
a circuit in communication with a battery and a rechargeable energy storage device, the circuit placing the battery and the rechargeable energy storage device in electrical communication with the actuator during the dispense event such that the actuator receives power from the battery and the rechargeable energy storage device during the dispense event,
wherein the circuit places the battery and the rechargeable energy storage device in parallel in the absence of the dispense event such that the battery recharges the rechargeable energy storage device.

12. The dispenser of claim 11, comprising:
a refill unit containing the material, wherein the pump is in communication with the refill unit.

13. The dispenser of claim 12, wherein the battery is on the refill unit.

14. The dispenser of claim 13, comprising:
a housing, wherein at least one of the pump, the actuator, the circuit, or the rechargeable energy storage device is on the housing and the refill unit is selectively attachable to the housing.

15. The dispenser of claim 14, wherein the rechargeable energy storage device is on the housing.

16. The dispenser of claim 11, wherein the rechargeable energy storage device comprises a plurality of capacitors.

17. The dispenser of claim 16, wherein during the dispense event, the rechargeable energy storage device provides a voltage to the actuator that is equal to the added voltages of each of the plurality of capacitors and the battery.

18. The dispenser of claim 11, wherein the circuit places the battery and the rechargeable energy storage device in series during the dispense event.

19. The dispenser of claim 11, wherein the battery has a voltage of less than about 3 volts.

20. The dispenser of claim 11, wherein the rechargeable energy storage device is a supercapacitor.

21. A method of operating a dispenser for dispensing a material, comprising:
placing a battery and a rechargeable energy storage device of the dispenser in series during a dispense event such that an actuator that facilitates dispensing the material during the dispense event receives power from the battery and the rechargeable energy storage device during the dispense event; and
placing the battery and the rechargeable energy storage device in parallel in the absence of the dispense event such that the battery recharges the rechargeable energy storage device.

22. A dispenser for dispensing a material, comprising:
a pump in communication with the material;
an actuator in communication with the pump to actuate the pump to dispense the material during a dispense event;
a battery; and
a rechargeable energy storage device, wherein the battery and the rechargeable energy storage device are in series during the dispense event such that the actuator receives power from the battery and the rechargeable energy storage device during the dispense event,
wherein the battery and the rechargeable energy storage device are in parallel in the absence of the dispense event such that the battery recharges the rechargeable energy storage device.

23. The dispenser of claim 22, comprising:
a refill unit containing the material, wherein the pump is in communication with the refill unit and the battery is on the refill unit.

24. The dispenser of claim 23, comprising:
a housing, wherein at least one of the pump, the actuator, or the rechargeable energy storage device is on the housing and the refill unit is selectively attachable to the housing.

\* \* \* \* \*